Jan. 22, 1946.    L. WINSTROM    2,393,352
MANUFACTURE OF FUMARIC ACID
Filed July 16, 1942
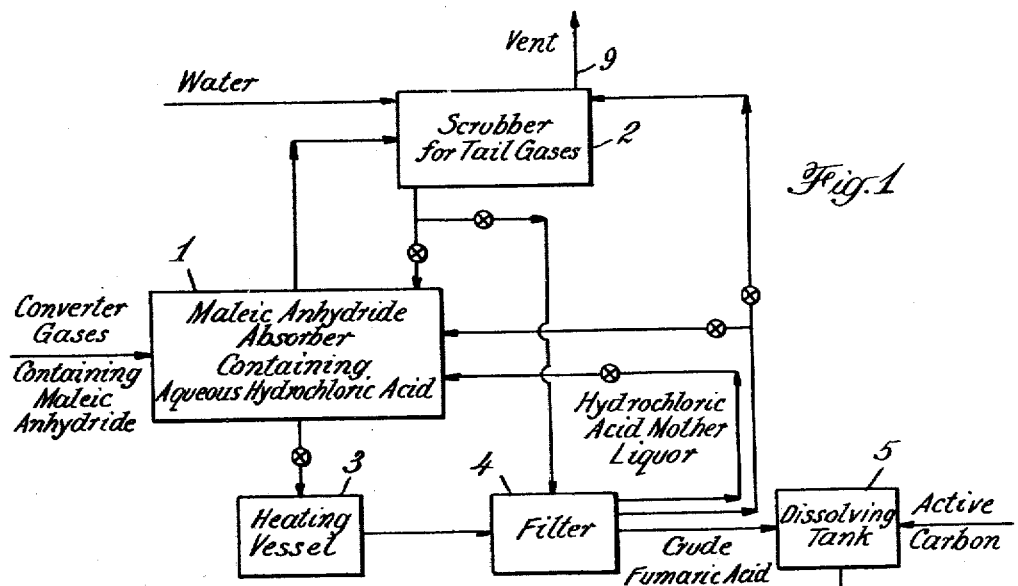
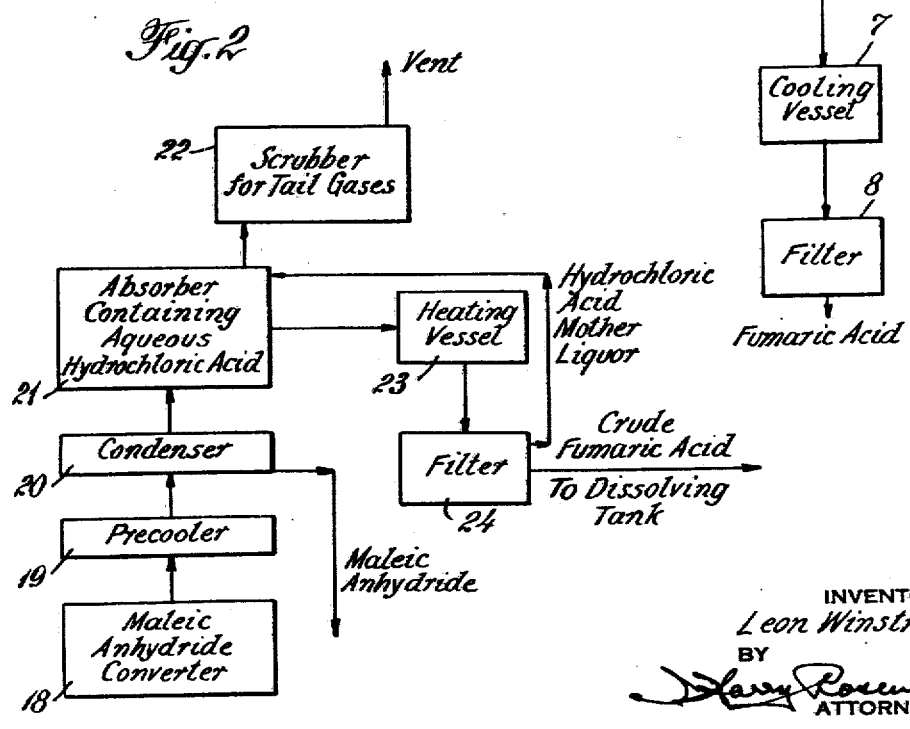
INVENTOR
Leon Winstrom
BY
Harry Rosenberg
ATTORNEY Patented Jan. 22, 1946

2,393,352

UNITED STATES PATENT OFFICE 2,393,352

MANUFACTURE OF FUMARIC ACID

Leon Winstrom, Tonawanda, N. Y., assignor to Allied Chemical & Dye Corporation, New York, N. Y., a corporation of New York Application July 16, 1942, Serial No. 451,133

16 Claims. (Cl. 260—537)

This invention relates to a process for the manufacture of fumaric acid. It relates more particularly to a process for the manufacture of fumaric acid directly from maleic anhydride vapors produced by the catalytic vapor-phase oxidation of organic compounds.

It is a principal object of the present invention to provide an efficient and economical process of producing fumaric acid directly from the vapors of maleic anhydride which are contained in gaseous mixtures resulting from the catalytic vapor phase oxidation of organic compounds, and particularly benzene.

Other objects of the invention will in part be obvious and will in part appear hereinafter.

It is known that maleic acid can be converted into fumaric acid by heating, particularly in the presence of catalysts. Thus, Terry and Eichelberger, Jour. Amer. Chem. Soc., vol. 47, page 1402 (1925) studied the effect as catalysts of hydrobromic acid, hydrochloric acid and potassium thiocyanate on the conversion of maleic acid to fumaric acid. This study was made for the scientific purpose of discovering the mechanism of the reaction by which maleic acid is transformed into fumaric acid. The yields of fumaric acid obtained were appreciable, but did not approach the yield required for a commercially practical process.

It is also known to produce maleic acid by absorbing in water maleic anhydride vapors present in the gaseous mixtures produced by the catalytic vapor-phase oxidation of organic compounds; such as, the converter gases resulting from the catalytic vapor-phase oxidation of benzene, toluene, phenol, phthalic anhydride, butylene, butyl alcohol, furane, furfural, turpentine, cyclohexane, cyclohexanol, and the like; the gaseous mixtures remaining after a preliminary separation of part of the maleic anhydride from such converter gases by condensation or by absorption in a non-aqueous solvent; the gaseous mixtures remaining after the separation of other products (such as, phthalic anhydride) from converter gases produced in other catalytic vapor-phase oxidation processes; and the like.

The converter gases containing maleic anhydride as a main or subsidiary product usually contain other organic compounds which separate from the gases along with the maleic anhydride and contaminate the recovered maleic anhydride or maleic acid product. Depending upon the starting materials, the catalysts, and the reaction conditions employed, the contaminants include various types of oxidation products and derivatives thereof; for example, they may be quinones (especially benzoquinone when benzene is employed as a starting material), aldehydes, ketones, and/or condensation and/or polymerization products thereof. In order to avoid contamination of the fumaric acid or other products produced from such maleic acid, it has been the practice heretofore to isolate and purify the maleic acid before converting it to other products, such as fumaric acid.

The present invention is based on the discovery that fumaric acid can be produced from maleic anhydride vapors present in gases resulting from the vapor phase catalytic oxidation of organic compounds by absorbing the maleic anhydride vapors in aqueous mineral acid solution, particularly hydrochloric acid solutions, and recovering the resulting fumaric acid. It has been discovered that, as a result of the process of the present invention, impurities which are normally present in converter gases are converted to a form which can be readily removed from fumaric acid. As a result, fumaric acid can be obtained in a high state of purity and in excellent yield by a simple and efficient process. By the process of the present invention fumaric acid can be readily produced from maleic anhydride vapors present in converter gases without the intermediate isolation and purification of maleic acid.

The invention accordingly comprises the several steps and the relation of one or more of such steps with respect to others thereof which will be exemplified in the process hereinafter disclosed. The scope of the invention will be indicated in the claims.

In the practice of the present invention in accordance with a preferred method of procedure, converter gases containing maleic anhydride vapors, particularly those produced by the catalytic vapor-phase oxidation of benzene, are passed into hydrochloric acid solution. In one embodiment of the invention the gases are passed from the converter into the hydrochloric acid solution. In another embodiment of the invention a part of the maleic anhydride is first removed and the remaining gases are passed into the hydrochloric acid solution. Preferably the gases are cooled (but not below the dew-point of the gaseous mixtures with respect to maleic anhydride) so as to avoid raising the temperature of the hydrochloric acid solution to its boiling point. Fumaric acid is formed and, owing to its low degree of solubility in hydrochloric acid, precipitates from the solution. A preferred form of the invention includes heating the resulting hydrochloric acid solution (in admixture with the precipitated fumaric acid or after removal of the precipitate) in order to complete the conversion of the maleic acid present to fumaric acid. The precipitated fumaric acid is recovered by filtration, purified by dissolving it in hot water and treating the solution with a small amount of adsorbent charcoal, and recovered by filtration from the cooled solution.

It is a feature of the present invention that impurities which are present in the crude fumaric acid which precipitates from the hydrochloric acid solution are readily removed by the charcoal treatment. Thus, the present treatment produces a fumaric acid which is white and substantially free from impurities, being from 99.3 to 99.3 per cent pure, and which is therefore suitable for practically all commercial purposes without further treatment. This is surprising in view of the fact that maleic acid recovered from converter gases by absorption in water is not readily purified by the charcoal treatment.

A further important and unexpected advantage of the present process is the absence of accumulation of impurities in the hydrochloric acid solution used as the absorbent; so that, after filtering off the fumaric acid, the solution can be returned for reuse in absorbing more maleic anhydride vapors from converter gases. It has been found that the hydrochloric acid can be reused almost indefinitely without substantial deterioration of the quality of the fumaric acid formed or a lowering of the yield. Apparently the action of the hydrochloric acid is such as to convert impurities that are present in the converter gases into a form which is removed (e. g., by filtration, as above indicated) with the precipitated fumaric acid and then easily removed from the fumaric acid by further treatment. Thus the impurities do not build up in the hydrochloric acid solution. This is a commercially important advantage in that it is necessary substantially only to replace the small quantity of hydrochloric acid which is lost mechanically in the handling of the solution, and the process may be carried out continuously or semi-continuously, as desired.

An additional feature of the present invention is the beneficial effect of the passage of converter gases containing maleic anhydride through the hydrochloric acid solution employed as absorbent. When the converter gases are passed through the hydrochloric acid solution a constant boiling solution is formed whose composition depends on the particular temperatures employed. Thus, if converter gases at about 125° C. are passed into a hydrochloric acid solution which is at about 60° C., both of which are good working temperatures, a constant boiling hydrochloric acid solution of about 11 per cent strength may be formed. If a higher initial concentration of acid is present, the converter gas stream will remove hydrogen chloride until a concentration of 11 per cent HCl is attained, or if a lower initial concentration is present, water will be removed by the converter gases until a solution of 11 per cent HCl is formed. The continuous introduction of maleic anhydride into the absorbent serves to build up and maintain a high concentration of maleic acid in the solution and thereby to sustain a large conversion thereof to fumaric acid.

For a fuller understanding of the nature and objects of the invention, reference should be had to the following detailed description, taken in connection with the accompanying drawing in which Figures 1 and 2 are diagrammatic flow sheets of two embodiments of the present process.

*Example 1.*—A mixture of air and benzene vapors containing 30 to 35 parts by weight of air per part by weight of benzene is passed over an oxidation catalyst comprising a mixture of oxides of vanadium, molybdenum and uranium coated on an "Alundum" carrier while the catalyst is maintained at a temperature of about 500° to 540° C., the contact time being about 0.1 second. The resulting converter gases, containing, by weight, about 2 per cent of maleic anhydride, about 2 per cent of water vapor, about 5 per cent of carbon dioxide and the remainder principally of nitrogen together with traces of benzene, carbon monoxide, other partial oxidation products, and other impurities, are cooled to a temperature of 125° C. and introduced below the surface of aqueous hydrochloric acid in an absorber 1. The absorber, which is constructed of suitable acid-resisting material and contains means, such as a dip-pipe or other means, for contacting liquid and gas, a stirrer and a thermometer, is originally charged with an aqueous solution of hydrochloric acid prepared by mixing 143 parts of 20° Bé. hydrochloric acid with 82 parts of water (by weight). The exit gases from the absorber are passed into a scrubber 2 containing water by which the exit gases are scrubbed before passing through vent 9. The passage of the converter gases through the hydrochloric acid solution in the absorber raises the temperature of the absorber to about 60° C. If necessary, the absorber is cooled so as to maintain the temperature of the solution at about 60° C., although cooling is not usually required. As the gas mixture passes through the hydrochloric acid solution, maleic anhydride is absorbed and hydrolyzed to maleic acid, part of which is converted to fumaric acid. The continuous passage of the converter gases through the absorber removes hydrochloric acid which is caught in the scrubber 2. The level of liquid in the absorber 1 is maintained constant by replenishment with liquid from scrubber 2, when necessary. Owing to the insolubility of fumaric acid in the hydrochloric acid solution, the fumaric acid precipitates and the hydrochloric acid solution becomes a more or less thick slurry. When the amount of fumaric acid formed is such as to interfere with efficient operation, usually after about 16 hours under the above conditions, the introduction of converter gases is interrupted and the slurry is discharged from the absorber into a heating vessel 3. The slurry is heated to about 100° C. and maintained at this temperature for one to two hours to complete the conversion of maleic acid in the hydrochloric acid solution to fumaric acid. The slurry is then cooled to about 30° C., held there for about two hours to complete the precipitation of fumaric acid, and then passed to filter 4, where it is filtered. The filter cake of fumaric acid is first washed with liquid from the scrubber 2, and then is washed acid-free with water; i. e., until the washings contain less than 1 per cent acid by volume.

The crude fumaric acid recovered from the filter is charged to a dissolving tank 5 where it is dissolved in hot water (100° C.). "Darco" (a commercial form of activated charcoal) in an amount equal to about 1 per cent of the weight of the fumaric acid filter-cake is added to the solution and the mixture is boiled for 5 to 10 minutes. The hot solution is filtered in the filter 6 to remove the "Darco" and impurities which have been adsorbed thereby, and the filtrate is passed to cooling vessel 7. Fumaric acid crystallizes out and is recovered by filtering in filter 8.

The fumaric acid thus produced is white, substantially free from impurities, has a fumaric acid content of 99.6 to 99.8 per cent, and is suitable for practically all commercial purposes without further treatment.

The hydrochloric acid solution obtained as a filtrate from filter 4 is returned to absorber 1 for reuse in a repetition of the process. A part of the first wash liquid is added to make up any deficiency of acid in the absorber 1, and the remainder is returned to the scrubber 2 for use in making up scrubbing liquid.

*Example 2.*—Converter gases having a composition similar to that of the gases employed in Example 1 are generated in a converter 18, subjected to a preliminary cooling in a precooler 19 to a convenient temperature (for example, 125° C.), and are then introduced into a condenser 20 where they are cooled to a temperature of about 40° C. This temperature is below the dew-point of the gases with respect to maleic anhydride but above the dew-point of the gases with respect to water. As a result of the cooling, a part of the maleic anhydride condenses and separates from the gases. The remaining gases, containing 20 to 30 per cent of the original content of maleic anhydride, are then passed into an absorber 21 which is similar in construction to absorber 1. The gases are introduced below the surface of aqueous hydrochloric acid contained in the absorber which is maintained at a temperature of about 30° to about 35° C. The absorber is originally charged with aqueous hydrochloric acid containing 10 to 15 per cent by weight of hydrogen chloride, and preferably 11 to 12 per cent by weight of hydrogen chloride. As the gas mixture passes through the hydrochloric acid solution, maleic anhydride is absorbed and hydrolyzed to maleic acid, part of which is converted to fumaric acid. The exit gases from the absorber are passed into a scrubber 22 containing water by which the exit gases are scrubbed. The continuous passage of the converter gases through the absorber removes hydrochloric acid which is caught in the scrubber 22. The level of liquid in the absorber 21 is maintained constant by replenishment with liquid from scrubber 22 when necessary. As in the process of Example 1, fumaric acid formed in the absorber precipitates and the hydrochloric acid solution becomes a more or less thick slurry. The introduction of the gases is continued until the concentration of organic acids (maleic and fumaric acids) in the slurry is about 40 per cent by weight. The slurry is then discharged from the absorber into a heating vessel 23 and the slurry is then further treated, to complete the conversion of maleic acid to fumaric acid, which is passed to filter 24 and passed to the dissolving tank and further treated to purify and recover the fumaric acid, in the manner described in Example 1. Owing to the relatively higher concentration of impurities with respect to maleic anhydride in the gases introduced into absorber 21 than is present in the gases introduced into absorber 1, a somewhat larger amount of "Darco" is employed (about 2 per cent of the weight of the fumaric acid filter cake) in carrying out the purification of the fumaric acid in accordance with the procedure of this example.

The procedure of this example has the advantage that it makes possible the utilization of the maleic anhydride content of converter gases resulting from the catalytic oxidation of organic compounds for the direct production of maleic anhydride and fumaric acid by a flexible process which may be altered, in accordance with the respective demands for the two products, to produce a greater or smaller amount of fumaric acid in relation to the amount of maleic anhydride produced. Thus, while in Example 2 the gases issuing from the converter are cooled to about 40° C., which results in condensation of 70 to 80 per cent of the maleic anhydride content of the converter gases in the form of maleic anhydride, higher condensation temperatures may be used, with a resulting recovery of a smaller percentage of the maleic anhydride content of the converter gases in the form of maleic anhydride and a corresponding higher production of fumaric acid. In addition it makes possible the direct recovery of maleic anhydride, as such, by condensation from converter gases under conditions which avoid substantial condensation of water, and the direct utilization of residual maleic anhydride in the gases for production of fumaric acid.

It will be realized by those skilled in the art that the invention is not limited to the details of the foregoing description and that changes can be made without departing from the scope of the invention.

Thus, the process may be applied for the production of fumaric acid from converter gases obtained in the catalytic vapor phase oxidation of organic compounds of various types. For example, it may be employed for the production of fumaric acid from maleic anhydride contained in various gas mixtures of the type above mentioned. Further, it may also be employed for the production of fumaric acid from maleic anhydride vapors remaining in the tail gases after removal of the major portion of the maleic anhydride by another process; and it may be employed for the production of fumaric acid from maleic anhydride present as a by-product in the converter gases of the vapor phase catalytic oxidation of compounds such as, for example, naphthalene, after removal from the said gases of the main product; e. g., phthalic anhydride. Accordingly, it will be understood that where the term "converter gases" is employed in the claims, such tail gases and related gas mixtures are meant to be included, unless otherwise indicated.

The temperature to which the converter gases are cooled prior to introduction into the absorbent can be varied and will depend in part upon the preliminary treatment to which the converter gases have been subjected and upon the absorption temperature employed.

The temperature at which the absorbing mineral acid is maintained during the absorption also may be varied. In general a temperature as high as is commercially practicable is employed inasmuch as the conversion to fumaric acid is influenced by the temperature, being more rapid at the higher temperatures. For efficient operation with hydrochloric acid while avoiding undue loss of hydrochloric acid and without requiring operation under superatmospheric pressure, temperatures below 60° C. are preferred, temperatures of 40° to 60° C. being preferred in the process of Example 1. While such a procedure ordinarily requires subsequent heating of the solution to complete conversion of maleic acid present in the absorbing solution to fumaric acid, such a process is more easily operated. It will be understood, however, that the invention is not limited with respect to the extent which conversion of maleic acid to fumaric acid occurs in the absorber; it includes a minimum conversion of the maleic acid in the absorber with subsequent heating in the same or another vessel, and maximum conversion in the absorber. Thus, it includes the operation of the absorber at high temperatures (e. g., in the neighborhood of 100° C.) in which case a supplementary heating operation ordinarily is not necessary. It is noted, however, that unless additional equipment is provided for the recovery of mineral acid and its maintenance in the absorber (e. g., by the use of superatmospheric pressure) certain of the beneficial advantages of the preferred process will not be obtained, such as efficient reuse of the mineral acid.

For continuous and economical operation, the temperature of the hydrochloric acid absorber should not be less than the dew-point of the entering gases with respect to water. Otherwise, condensation of water from the gases will take place with consequent undesirable dilution of the hydrochloric acid. In the procedure of Example 2, temperatures higher than 30° to 35° C. may be employed in the absorber and are even advantageous, since water is removed from the absorber more rapidly than hydrogen chloride at the higher temperatures. The self-concentrating action of the hydrochloric acid absorption liquid makes possible the addition of wash and scrubbing liquors to the absorber for utilization of their hydrochloric acid contents without permanent dilution of the hydrochloric acid solution in the absorber. This advantage of higher temperatures is offset, however, by the additional cost of maintaining the absorber at higher temperatures by addition of external heat.

The duration of the absorption period may be varied. Thus, if desired, the converter gases may be passed through the absorbent liquid for only a short period of time and the resulting solution then subjected to a further heating treatment and recovery and purification of fumaric acid. By providing a plurality of absorbers together with properly balanced heating, cooling and filtering equipment, the process may be operated continuously in connection with the continuous operation of a catalytic oxidation converter.

The concentration of hydrochloric acid employed as absorbing liquid also may be varied. Hydrochloric acid of about 10 to about 20 per cent strength is ordinarily employed in connection with the preferred operation of the process. The use of more dilute solutions of hydrochloric acid results in slower rates of conversion of maleic acid into fumaric acid. With more concentrated hydrochloric acid, especially at the higher temperatures, the gases passing through the absorber tend to pick up excessive amounts of hydrogen chloride which must be subsequently recovered.

The invention also is not limited to the use of hydrochloric acid but includes the use of other aqueous mineral acids; for example hydrobromic acid, hydriodic acid and sulfuric acids. Nitric acid also can be used, although it is not as desirable as other mineral acids due to its oxidizing tendencies.

The invention further is not limited to a procedure in which all of the maleic acid present in the absorption liquor is converted to fumaric acid in the heating vessel. Thus, especially in connection with a procedure involving continuous operation with recycling of hydrochloric acid as absorbent, the hydrochloric acid absorbent liquor containing fumaric acid and unconverted maleic acid may be heated in the heating vessel for a relatively short period of time (e. g., half an hour) and, after separation of the precipitated fumaric acid, may be again reused as absorbent liquor for additional maleic anhydride.

The fumaric acid obtained as a product of the absorption may be purified in other ways. In view of its simplicity, the process above described is preferred. Owing to the low degree of solubility of fumaric acid in cold water, the purification is preferably carried out by dissolving the crude fumaric acid in hot water and treating the resulting solution with a solid adsorbent. Solid adsorbents especially useful are activated forms of animal and wood charcoals of which "Darco" and "Nuchar" are representative.

Since different embodiments of the invention can be made without departing from the scope of this invention, it is intended that all matter contained in the above description or shown in the accompanying drawing shall be interpreted as illustrative and not in a limiting sense.

I claim:

1. A process of manufacturing fumaric acid from maleic anhydride-containing converter gases resulting from the vapor phase catalytic oxidation of an organic compound which comprises absorbing maleic anhydride vapor contained in said gases in an aqueous solution of mineral acid, and separating a fumaric acid precipitate from the resulting mixture.

2. A process of manufacturing fumaric acid from maleic anhydride-containing converter gases resulting from the vapor phase catalytic oxidation of an organic compound which comprises absorbing maleic anhydride vapor contained in said gases in aqueous hydrochloric acid, and separating a fumaric acid precipitate from the resulting mixture.

3. A process of manufacturing fumaric acid from maleic anhydride-containing converter gases resulting from the vapor phase catalytic oxidation of an organic compound which comprises absorbing maleic anhydride contained in said gases in an aqueous solution of mineral acid, heating the resulting mixture to form fumaric acid, and separating a fumaric acid precipitate from the mixture.

4. A process of manufacturing fumaric acid from maleic anhydride-containing converter gases resulting from the vapor phase catalytic oxidation of an organic compound which comprises absorbing maleic anhydride contained in said gases in aqueous hydrochloric acid, heating the resulting mixture to form fumaric acid, and separating a fumaric acid precipitate from the mixture.

5. A process of manufacturing fumaric acid from maleic anhydride-containing converter gases resulting from the vapor phase catalytic oxidation of an organic compound which comprises absorbing maleic anhydride contained in said gases in a heated aqueous solution of a mineral acid, and separating a fumaric acid precipitate from the resulting mixture.

6. A process of manufacturing fumaric acid from maleic anhydride-containing converter gases resulting from the vapor phase catalytic oxidation of an organic compound which comprises passing the converter gases containing maleic anhydride together with water vapor and impurities into aqueous hydrochloric acid, maintaining the temperature of the aqueous hydrochloric acid above the dew-point of the converter gases with respect to water under the existing pressure conditions, separating fumaric acid together with impurities from the resulting mixture, and reusing the remaining solution for absorbing more maleic anhydride from converter gases.

7. A process of manufacturing fumaric acid from maleic anhydride-containing converter gases resulting from the vapor phase catalytic oxidation of an organic compound which comprises absorbing maleic anhydride vapor contained in said gases in aqueous hydrochloric acid, heating the solution to form fumaric acid, separating fumaric acid together with impurities from the resulting mixture, and reusing the remaining solution for absorbing more maleic anhydride from converter gases.

8. A process of manufacturing fumaric acid from maleic anhydride-containing converter gases resulting from the vapor phase catalytic oxidation of an organic compound which comprises absorbing maleic anhydride vapor contained in said gases in aqueous hydrochloric acid, heating the solution to form fumaric acid, separating precipitated fumaric acid together with impurities from the resulting mixture, dissolving the impure fumaric acid in water, treating the fumaric acid solution with a solid adsorbent to remove impurities, and recovering fumaric acid in a purified form from the treated solution.

9. In a process of manufacteuring fumaric acid from maleic anhydride-containing converter gases resulting from the vapor phase catalytic oxidation of an organic compound, the improvement which comprises passing the converter gases containing maleic anhydride together with water vapor and impurities into aqueous hydrochloric acid of 10 to 20 per cent strength maintaining the solution at a temperature between the dew-point of the converter gases with respect to water under the existing pressure conditions and 100° C., and separating a fumaric acid precipitate from the resulting mixture.

10. A process of manufacturing fumaric acid from maleic anhydride-containing converter gases resulting from the vapor phase catalytic oxidation of an organic compound which comprises passing the converter gases containing maleic anhydride together with impurities into aqueous hydrochloric acid of 10 to 20 per cent strength while maintaining the solution at 40° to 60° C., at least until fumaric acid precipitates, heating the resulting maleic acid solution at a temperature of 80° to 100° C. to convert maleic acid to fumaric acid, separating precipitated fumaric acid together with impurities from the resulting mixture, dissolving the impure fumaric acid in water, treating the fumaric acid solution with a solid adsorbent to remove impurities, and recovering fumaric acid in a purified form from the treated solution.

11. A process of manufacturing fumaric acid from maleic anhydride-containing converter gases resulting from the vapor phase catalytic oxidation of an organic compound which comprises passing the converter gases containing maleic anhydride together with impurities into aqueous hydrochloric acid of 10 to 20 per cent strength while maintaining the solution at 40° to 60° C., at least until fumaric acid precipitates, heating the resulting maleic acid solution at about 100° C. for 1 to 2 hours to convert maleic acid to fumaric acid, and separating precipitated fumaric acid together with impurities from the resulting mixture.

12. A process of manufacturing fumaric acid from maleic anhydride-containing converter gases resulting from the vapor phase catalytic oxidation of benzene which comprises passing the converter gases containing maleic anhydride together with impurities into aqueous hydrochloric acid of 10 to 20 per cent strength while maintaining the solution at 40° to 60° C., heating the resulting maleic acid solution to convert maleic acid to fumaric acid, separating the resulting fumaric acid together with impurities from the remaining solution, and reusing the remaining solution for absorbing more maleic anhydride.

13. A process of manufacturing fumaric acid from maleic anhydride-containing converter gases resulting from the vapor phase catalytic oxidation of benzene which comprises passing the converter gases containing maleic anhydride together with impurities into aqueous hydrochloric acid of about 11 per cent strength while maintaining the solution at 40° to 60° C., at least until fumaric acid precipitates, heating the resulting mixture at about 100° C. for a sufficient time to convert substantially all of the maleic acid to fumaric acid, cooling the solution to precipitate fumaric acid, separating the precipitated fumaric acid together with impurities from the solution, dissolving the impure fumaric acid in water, treating the fumaric acid solution with a solid adsorbent to remove impurities, and recovering purified fumaric acid from the treated solution.

14. A process of manufacturing fumaric acid from maleic anhydride-containing converter gases resulting from the vapor phase catalytic oxidation of benzene which comprises passing the converter gases containing maleic anhydride together with impurities into aqueous hydrochloric acid of about 11 per cent strength while maintaining the solution at 40° to 60° C., at least until fumaric acid precipitates, heating the resulting mixture at about 100° C. for 1 to 2 hours, cooling the solution to precipitate fumaric acid, separating the precipitated fumaric acid together with impurities from the remaining solution, dissolving the impure fumaric acid in hot water, treating the fumaric acid solution with adsorbent carbon to remove impurities, and recovering purified fumaric acid from the treated solution.

15. In a process of manufacturing fumaric acid from converter gases resulting from the vapor phase catalytic oxidation of an organic compound and containing maleic anhydride together with organic impurities, the improvement which comprises cooling the converter gases to a temperature below the dew-point of the gases with respect to maleic anhydride but above the dew-point of the gases with respect to water under the existing pressure conditions, whereby a part of the maleic anhydride is condensed, removing condensed maleic anhydride, passing the remaining converter gases into aqueous hydrochloric acid of 10 to 20 per cent strength, and separating a fumaric acid precipitate from the resulting mixture.

16. A process of manufacturing fumaric acid from converter gases resulting from the vapor phase catalytic oxidation of benzene and containing maleic anhydride together with organic impurities, which comprises cooling the converter gases to a temperature below the dew-point of the gases with respect to maleic anhydride but above the dew-point of the gases with respect to water under the existing pressure conditions, whereby a part of the maleic anhydride is condensed, removing condensed maleic anhydride, passing the remaining converter gases into aqueous hydrochloric acid of about 11 per cent strength maintained at a temperature between the dew-point of the gases with respect to water and about 60° C., heating the resulting mixture at a temperature of 80° to 100° C. to convert maleic acid to fumaric acid, separting fumaric acid together with impurities from the resulting mixture, dissolving the impure fumaric acid in hot water, treating the fumaric acid solution with adsorbent carbon to remove impurities, and recovering purified fumaric acid from the treated solution.

LEON WINSTROM.

Certificate of Correction

Patent No. 2,393,352. January 22, 1946.

LEON WINSTROM

It is hereby certified that errors appear in the printed specification of the above numbered patent requiring correction as follows: Page 1, second column, line 17, for "solutions" read *solution*; page 5, first column, line 37, claim 9, after the word "strength" insert *while*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.* whereby a part of the maleic anhydride is condensed, removing condensed maleic anhydride, passing the remaining converter gases into aqueous hydrochloric acid of about 11 per cent strength maintained at a temperature between the dew-point of the gases with respect to water and about 60° C., heating the resulting mixture at a temperature of 80° to 100° C. to convert maleic acid to fumaric acid, separting fumaric acid together with impurities from the resulting mixture, dissolving the impure fumaric acid in hot water, treating the fumaric acid solution with adsorbent carbon to remove impurities, and recovering purified fumaric acid from the treated solution.

LEON WINSTROM.

Certificate of Correction

Patent No. 2,393,352. January 22, 1946.

LEON WINSTROM

It is hereby certified that errors appear in the printed specification of the above numbered patent requiring correction as follows: Page 1, second column, line 17, for "solutions" read *solution*; page 5, first column, line 37, claim 9, after the word "strength" insert *while*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*